Patented Jan. 30, 1945

2,368,267

UNITED STATES PATENT OFFICE 2,368,267

LATENT IMAGE INTENSIFICATION WITH SULPHUR DIOXIDE

Norwood L. Simmons, Hollywood, Calif., assignor to Eastman Kodak Company, Rochester, N. Y., a corporation of New Jersey No Drawing. Application June 9, 1943, Serial No. 490,184

4 Claims. (Cl. 95—6)

This invention relates to photography and particularly to a method for intensifying a photographic latent image.

It is well known that the photographic latent image may be intensified by various means. Ammonia fumes and post-exposure treatment with radiation from safe lights have been used for this purpose. Hypersensitizing the unexposed light-sensitive emulsion, for example, with mercury vapor, is also known. Treatment of the exposed emulsion with heat and humidity to accomplish an increase in sensitivity is described in Capstaff U. S. Patent 2,168,971, granted August 8, 1939.

It is an object of my invention to provide a method for increasing the emulsion sensitivity or speed of photographic materials by a simple post-exposure treatment so that the photographic materials may be used under light conditions which were previously considered unsatisfactory for the registration of a good photographic image. A further object of my invention is to provide a method which will permit under-exposed films, such as motion picture films, to be salvaged by a treatment which will increase their effective speed. Other objects will appear from the following description of my invention.

These objects are accomplished by treatment of an exposed gelatino-silver halide emulsion layer with a source of sulphur dioxide gas. The source of sulphur dioxide gas may be external to the photographic material or may be incorporated in the film itself. My latent image intensification method results in an emulsion speed increase of from 2 to 4 times.

The latent image intensification according to my invention may be effected by the use of a source of sulphur dioxide as follows:

1. A small quantity of any photographic developer containing sulphite ions is added to a dilute solution of acetic acid of such concentration that the pH is 4.5 or lower after the addition of the developer. While this is a satisfactory source of sulphur dioxide, it has the disadvantage that if used in a closed vessel the air becomes saturated with water vapor and may cause an undesirable tacky condition of the film emulsion.

2. The following solution produces sulphur dioxide gas:

| | Parts |
|---|---|
| Sulphuric acid | 43.5 |
| Water | 100 |
| Sodium sulphite | 10 |

The amounts of the three components used in this mixture may be varied within wide limits. This mixture has the property of allowing a partial pressure of water vapor to be exerted of such value that in a closed vessel at a temperature of from 55° F. to 90° F. the film contained therein is in equilibrium with approximately 50% relative humidity. This condition is desirable from the standpoint of ease of handling the film and for other reasons relating to the quality of the finished product.

3. Liquid sulphur dioxide held at a temperature below its boiling point may also be employed.

These sources of sulphur dioxide may be used in any of the following ways in the treatment of the exposed silver halide emulsion.

(1) The mixture may merely be allowed to stand in an open tray in proximity to the film to be treated. It is essential only that the sulphur dioxide gas actually reach the exposed emulsion surface. I have found that sensitivity increases may be brought about by this method on certain types of panchromatic negative emulsions such as Eastman Plus X Emulsions even though the sulphur dioxide concentration is so low in the vicinity of the film that its odor cannot be detected. This method is slow because of the low concentration of sulphur dioxide reaching the emulsion surface and is subject to only rough control because of its dependence upon local air disturbances.

(2) The source of sulphur dioxide may be confined to a small closed vessel in which the film is placed in such manner that all parts of the exposed area are subjected equally to the action of the gas. A false bottom dessicator may be used for such purpose.

(3) The exposed film may be allowed to travel through a cabinet containing sulphur dioxide.

(4) Compounds may be incorporated in the emulsion or in a layer of the film such as a subbing layer, interlayer, overcoating layer or backing layer, which release sulphur dioxide photochemically during or after exposure of the film.

It is obvious that any of the methods listed above, especially method 3, will be effective only after a sufficient time of contact with the gas has been established. This may be accomplished in two ways. The photographic product may be allowed to remain in the atmosphere containing the sulphur dioxide for the full time of treatment followed by development. Another method of establishing sufficient time of contact with the gas is to allow the photographic product to remain in the sulphur dioxide atmosphere for only a short time, for example, as little as 5 minutes, after which the film is held in a tightly closed container, preferably with not too much air space, for a longer period of time, for example 48 hours, before development.

The following specific examples will serve further to illustrate the nature and scope of my invention.

*Example 1*

A high speed negative gelatino-silver halide emulsion, such as Eastman Panchromatic negative motion picture film, was exposed on a standard sensitometer, for example, Eastman Type 2B sensitometer, and was then subjected in a closed container to various times of treatment with sulphur dioxide gas prepared as described in the second method above. After the sulphur dioxide treatment, the test strips were placed in small taped cans and held for the times indicated in the following table before being developed.

| Time kept in sulphur dioxide following exposure | | Time held in taped can after sulphur dioxide treatment and prior to development | | Sensitometric results | | |
|---|---|---|---|---|---|---|
| Hours | Minutes | Hours | Minutes | Speed | Gamma | Fog |
|  | 0 | 48 |  | 576 | .74 | .04 |
|  | 5 | 47 | 55 | 891 | .69 | .06 |
|  | 10 | 47 | 50 | 976 | .67 | .06 |
|  | 20 | 47 | 40 | 1,040 | .68 | .06 |
|  | 45 | 47 | 15 | 1,260 | .71 | .05 |
| 3 |  | 45 |  | 1,550 | .77 | .05 |
| 48 |  |  | 0 | 1,780 | .80 | .09 |

The emulsion speeds were read as 10/E at a density of 0.3 above base color plus fog where E is exposure in meter-candle-seconds. No appreciable difference in graininess in any of the samples in the table could be detected by comparison with equivalent densities under low power magnification. The sulphur dioxide gas was given free access to the entire emulsion surface, that is, the film was not in roll form. In other tests on the same emulsion type, a speed increase of over 100% was obtained by treating the film in the form of a loosely wound roll. After the sulphur dioxide treatment, the films were developed in a solution of the following composition:

| | |
|---|---|
| Monomethyl - p - aminophenol sulphate grams | 1.2 |
| Hydroquinone do | 3 |
| Sodium sulphite do | 20 |
| Borax do | 1.2 |
| Water to liter | 1 |

The film was then fixed in the usual way and the values for speed, gamma and fog given in the table above were determined.

*Example 2*

A multi-layer color film such as Kodachrome sheet film, outdoor type, was exposed on a special sensitometer to produce a gray scale as well as the three primary color scales and their complementary scales and was then subjected in a closed container to treatment for 24 hours with sulphur dioxide gas in a closed container for a period described above. After development of the film in the usual manner in color-forming developers, examination of the gray and color scales indicated that the treated sample had gained the equivalent of more than one full camera stop in speed with no loss in color balance. Analysis of the H and D curves revealed a very slight loss in contrast with a speed gain at a density of 1.0 of 120%. Test pictures treated in the same way agreed with these findings.

*Example 3*

A positive gelatino-silver halide emulsion, such as Eastman motion picture positive film, was exposed on a standard sensitometer, such as Eastman Type 2B sensitometer, and was then subjected in a closed container for 24 hours to the action of sulphur dioxide prepared by the first and second methods described above and was then developed in a normal manner. The treated strips exhibited speed increases of from 300% to 500% without noticeable increase in graininess.

My method of intensifying the latent image renders the contrast of the developed image somewhat higher in the toe region of the sensitometric curve, which fact may be regarded as an increase in latitude and in many cases highly desirable. It renders more developable by a factor of more than 100% the latent image of the various photographic products tested without a noticeable increase in graininess and with minimum fog growth.

It will be understood that the examples and modifications included herein are illustrative only and that my invention is to be taken as limited only by the scope of the appended claims.

I claim:

1. The method of increasing the sensitivity of a gelatino-silver halide emulsion layer, which comprises exposing said layer to an actinic light image, treating the undeveloped layer with sulphur dioxide gas, removing the layer from the source of sulphur dioxide gas and storing it for an appreciable period of time, and then developing an image in said layer.

2. The method of increasing the sensitivity of a gelatino-silver halide emulsion layer, which comprises exposing said layer to an actinic light image, treating the undeveloped layer in a closed container with sulphur dioxide gas produced by acidifying an aqueous solution of an alkali metal sulphite, removing the layer from the source of sulphur dioxide gas and storing it for an appreciable period of time, and then developing an image in said layer.

3. The method of increasing the sensitivity of a gelatino-silver halide emulsion layer, which comprises exposing said layer to an actinic light image, treating the undeveloped layer with sulphur dioxide gas in a closed container and then removing the layer from the source of sulphur dioxide gas and storing it in a closed container for a period of hours, and then developing an image in said layer.

4. The method of increasing the sensitivity of a gelatino-silver halide emulsion layer, which comprises exposing said layer to an actinic light image, treating the undeveloped layer with sulphur dioxide gas in a closed container for a period of time from 5 minutes to one hour and then removing the layer from the source of sulphur dioxide gas and storing it in a closed container for about two days and then developing an image in said layer.

NORWOOD L. SIMMONS.

CERTIFICATE OF CORRECTION.

Patent No. 2,368,267.                                  January 30, 1945.

NORWOOD L. SIMMONS.

It is hereby certified that error appears in the printed specification of the above numbered patent requiring correction as follows: Page 2, first column, lines 67 and 68, Example 2, for "gas in a closed container for a pescribed" read --prepared by the first method described--; and that the said Letters Patent should be read with this correction therein that the same may conform to the record of the case in the Patent Office.

Signed and sealed this 2nd day of October, A. D. 1945.

Leslie Frazer

(Seal)                              First Assistant Commissioner of Patents.